(12) United States Patent
Gauthier et al.

(10) Patent No.: US 7,129,800 B2
(45) Date of Patent: Oct. 31, 2006

(54) COMPENSATION TECHNIQUE TO MITIGATE AGING EFFECTS IN INTEGRATED CIRCUIT COMPONENTS

(75) Inventors: Claude R. Gauthier, Cupertino, CA (US); Pradeep R. Trivedi, Sunnyvale, CA (US); Raymond A. Heald, Los Altos, CA (US); Gin S. Yee, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 67 days.

(21) Appl. No.: 10/771,989

(22) Filed: Feb. 4, 2004

(65) Prior Publication Data

US 2005/0168255 A1 Aug. 4, 2005

(51) Int. Cl.
*H03L 1/00* (2006.01)
(52) U.S. Cl. ............... 331/175; 331/185; 331/186; 331/176; 331/66; 331/57; 327/156; 327/157; 327/158; 327/159
(58) Field of Classification Search ............ 331/108 C, 331/176, 185, 186, 66, 175, 57, 16; 327/156, 327/157, 158, 159
See application file for complete search history.

(56) References Cited

U.S. PATENT DOCUMENTS

| | | | |
|---|---|---|---|
| 5,636,130 A | 6/1997 | Salem et al. ............... 716/6 |
| 6,265,920 B1 | 7/2001 | Gauthier ............... 327/166 |
| 6,377,076 B1 | 4/2002 | Gauthier ............... 326/86 |
| 6,392,443 B1 | 5/2002 | Gauthier ............... 326/86 |
| 6,429,722 B1 | 8/2002 | Amick et al. ............ 327/379 |
| 6,441,640 B1 | 8/2002 | Gauthier et al. .......... 326/30 |
| 6,456,107 B1 | 9/2002 | Gauthier et al. .......... 326/27 |
| 6,462,604 B1 | 10/2002 | Amick et al. ............ 327/379 |
| 6,476,663 B1 | 11/2002 | Gauthier et al. ............ 327/513 |
| 6,483,341 B1 | 11/2002 | Gauthier et al. ............ 326/30 |
| 6,501,328 B1 | 12/2002 | Gauthier et al. ............ 327/551 |
| 6,549,030 B1 | 4/2003 | Amick et al. ............ 326/28 |
| 6,552,571 B1 | 4/2003 | Amick et al. ............ 326/93 |
| 6,556,041 B1 | 4/2003 | Gauthier et al. ............ 326/33 |
| 6,566,900 B1 | 5/2003 | Amick et al. ............ 324/760 |
| 6,570,420 B1 | 5/2003 | Trivedi et al. ............ 327/156 |
| 6,570,421 B1 | 5/2003 | Gauthier et al. ............ 327/156 |
| 6,570,422 B1 | 5/2003 | Trivedi et al. ............ 327/157 |
| 6,570,423 B1 | 5/2003 | Trivedi et al. ............ 327/157 |
| 6,573,770 B1 | 6/2003 | Gauthier et al. ............ 327/156 |
| 6,593,784 B1 | 7/2003 | Gauthier et al. ............ 327/156 |
| 6,597,218 B1 | 7/2003 | Gauthier et al. ............ 327/158 |
| 6,597,219 B1 | 7/2003 | Trivedi et al. ............ 327/158 |
| 6,605,988 B1 | 8/2003 | Gauthier et al. ............ 327/541 |
| 6,614,275 B1 | 9/2003 | Amick et al. ............ 327/158 |
| 6,614,287 B1 | 9/2003 | Gauthier et al. ............ 327/362 |
| 6,618,277 B1 | 9/2003 | Gauthier et al. ............ 363/74 |
| 6,628,135 B1 | 9/2003 | Gauthier et al. ............ 324/763 |
| 6,639,439 B1 | 10/2003 | Gauthier et al. ............ 327/156 |

(Continued)

*Primary Examiner*—Arnold Kinkead
(74) *Attorney, Agent, or Firm*—Dorsey & Whitney LLP (57) ABSTRACT

A method and apparatus for compensating for age related degradation in the performance of integrated circuits. In one embodiment, the phase-locked loop (PLL) charge pump is provided with multiple legs that can be selectively enabled or disabled to compensate for the effects of aging. In an alternate embodiment, the power supply voltage control codes can be increased or decreased to compensate for aging effects. In another embodiment, a ring oscillator is used to approximate the effects of NBTI. In this embodiment, the frequency domain is converted to time domain using digital counters and programmable power supply control words are used to change the operating parameters of the power supply to compensate for aging effects.

16 Claims, 11 Drawing Sheets

U.S. PATENT DOCUMENTS

| | | | |
|---|---|---|---|
| 6,642,756 B1 | 11/2003 | Yee et al. | 327/116 |
| 6,646,472 B1 | 11/2003 | Trivedi et al. | 326/93 |
| 6,646,473 B1 | 11/2003 | Trivedi et al. | 326/96 |
| 6,650,157 B1 | 11/2003 | Amick et al. | 327/158 |
| 6,658,629 B1 | 12/2003 | Bobba et al. | 716/2 |
| 6,662,126 B1 | 12/2003 | Liu et al. | 702/69 |
| 6,664,828 B1 | 12/2003 | Gauthier et al. | 327/157 |
| 6,664,831 B1 | 12/2003 | Gauthier et al. | 327/159 |
| 6,671,863 B1 | 12/2003 | Gauthier et al. | 716/6 |
| 6,686,785 B1 | 2/2004 | Liu et al. | 327/158 |
| 6,687,881 B1 | 2/2004 | Gauthier et al. | 716/2 |
| 6,691,291 B1 | 2/2004 | Gauthier et al. | 716/6 |
| 6,700,390 B1 | 3/2004 | Gauthier et al. | 324/600 |
| 6,701,488 B1 | 3/2004 | Amick et al. | 716/1 |
| 6,704,680 B1 | 3/2004 | Amick et al. | 702/130 |
| 6,707,320 B1 | 3/2004 | Trivedi et al. | 327/20 |
| 6,708,314 B1 | 3/2004 | Trivedi et al. | 716/2 |
| 6,720,813 B1 | 4/2004 | Yee et al. | 327/218 |
| 6,727,737 B1 | 4/2004 | Trivedi et al. | 327/158 |
| 6,734,716 B1 | 5/2004 | Amick et al. | 327/530 |
| 6,737,844 B1 | 5/2004 | Trivedi et al. | 323/283 |
| 6,778,024 B1 * | 8/2004 | Gupta et al. | 331/16 |
| 2003/0038648 A1 | 2/2003 | Gold et al. | 324/760 |
| 2003/0156622 A1 | 8/2003 | Gold et al. | 374/170 |
| 2003/0158696 A1 | 8/2003 | Gold et al. | 702/132 |
| 2003/0158697 A1 | 8/2003 | Gold et al. | 702/132 |
| 2004/0049370 A1 | 3/2004 | Stanley et al. | 703/14 |
| 2004/0051562 A1 | 3/2004 | Gauthier et al. | 326/98 |
| 2004/0088134 A1 | 5/2004 | Gauthier et al. | 702/132 |

* cited by examiner

COMPENSATION TECHNIQUE TO MITIGATE AGING EFFECTS IN INTEGRATED CIRCUIT COMPONENTS

BACKGROUND OF THE INVENTION

The features sizes of transistors used in integrated circuits have become significantly smaller as fabrication technology has advanced. For example, transistor feature sizes have scaled downward to the point that the oxide layer in a metal-on-oxide transistor is less than 10 angstroms thick. "Aging" effects that can result in instability of circuit components such as transistors have become more pronounced as the feature sizes have scaled downward. For example, in transistors fabricated with this thin oxide, phenomena have been observed whereby the threshold voltage (the voltage it takes to turn the transistor "on") varies over time.

Many integrated circuits, such as microprocessors, employ thermal sensors which rely on precise calibration to provide temperature-related compensation in the performance of various circuit elements. A shift in the threshold voltage can alter the speed of an on-die thermal oscillator by 10 to 15%. This will result in a skew of the calibration curve over the lifetime of the part, which is undesirable given the projected lifetime of 5 to 10 years for many circuit components.

One of the circuit elements that is particularly susceptible to aging effects is the phase-locked loop. Components used in the phase-locked loop can be affected by negative bias threshold instability (NBTI) that can alter the frequency range of a voltage controlled oscillator by 10% or more over a 10 year lifetime. This degradation is related to the drive current caused by increased PMOS strength. As a result, there is a need to alter other factors affecting drive current over time to compensate for the effects of NBTI and to ensure that the oscillator in the phase-locked loop achieves the same frequency range over its lifetime.

Another problem related to the aging effects of circuit components relates to operation of the delay-locked loop in a microprocessor. Similar to the effects on a phase-locked loop, NBTI effects can alter the lowest delay achieved by the delay-locked loop by 10% or more over the lifetime of the components. As a result, it is necessary to alter the factors affecting drive current such as the delay line in the delay-locked loop so that the delay-locked loop achieves the same frequency range over its entire lifetime.

In view of the foregoing, there is a need for a technique to compensate for aging effects in circuit components, such as transistors, in integrated circuits. Such a technique is provided in the various embodiments of the present invention, as discussed below.

SUMMARY OF INVENTION

The method and apparatus of the present invention provides an effective solution to alter operation of circuit components on a "post-silicon" basis, even years after the device has been fabricated. Circuits within the device that are sensitive to the effects of aging are provided with "hooks." In one embodiment, the phase-locked loop (PLL) charge pump is provided with multiple legs that can be selectively enabled or disabled. In other embodiments, the manner in which the calibration is interpreted can be changed to overcome the effects of aging. In an alternate embodiment, the power supply voltage control codes can be increased or decreased to compensate for aging effects. Once a processor has been characterized for the effects of aging at a manufacturing or test facility, a predicted aging-effect versus time curve is created. The hooks in the circuit can be selectively enabled or disabled by use of a service processor or a standard interface used to test the performance of the circuit. The hooks can be enabled or disabled by a service personnel at the facility or can be remotely enabled and disabled.

In an alternate embodiment of the present invention, the circuit itself controls system power level supply voltage through programmable control codes. In this embodiment, a ring oscillator (with a duty cycle equal to 50%) is used to approximate and capture the effects of NBTI on speed (approximately a change of 12%). In this embodiment, the frequency domain is converted to time domain using digital counters. The programmable control codes are updated based on the results from counters and the programmable control codes are used to raise the power supply output voltage as needed. This dispenses with the need to use a guardband to maintain performance of the circuit.

In another embodiment of the present invention, NBTI sensors are used to adjust the power supply voltage of the phase-locked loop to compensate for reductions in drive current. The required power supply changes affect the frequency of the voltage controlled oscillator and are communicated through an industry standard interface. A dummy ring oscillator is biased to oscillate at the lowest possible frequency which is the operating range at which variations from a predefined specification can have the worst effects. As the frequency degrades, the power supply is adjusted to increase the frequency of the oscillator.

In another embodiment of the invention, each of the delay-locked loop circuits has a special, dedicated power supply (VDD_DLL). In this embodiment, a dummy delay line is biased to delay the input clock with a known delay. The delay line is part of a sensor that detects shifts in delay over time relative to a fixed reference. As the shifts occur, and if they exceed a programmable threshold, the system raises the VDD_DLL voltage to account for the reduction in current. This results in voltage control delay lines having a voltage-delay curve that stays relatively constant over the life of the component.

Other aspects and advantages of the invention will be apparent from the following description and the appended claims.

DETAILED DESCRIPTION

Figure 1:
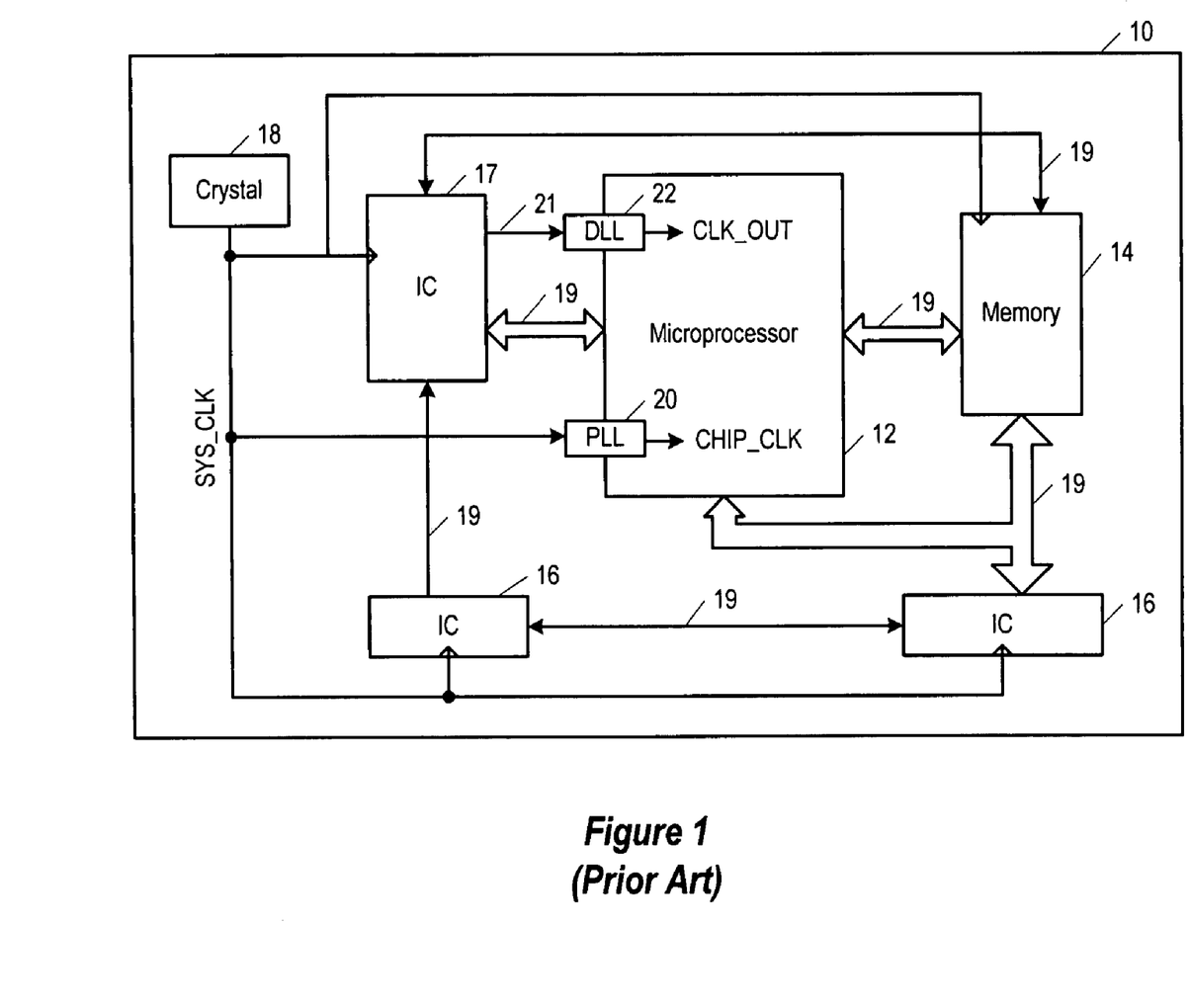
FIG. 1 is a system block diagram of a typical computer system.

As shown in FIG. 1, a typical computer system 10 has, among other components, a microprocessor 12, one or more forms of memory 14, integrated circuits 16 and 17 having specific functionalities, and peripheral computer resources (not shown), e.g., monitor, keyboard, software programs, etc. These components communicate with one another via communication paths 19, e.g., wires, buses, etc., to accomplish the various tasks of the computer system 10.

In order to properly accomplish such tasks, the computer system 10 relies on the basis of time to coordinate its various operations. To that end, a crystal oscillator 18 generates a system clock signal (referred to and known in the art as "reference clock" and shown in FIG. 1 as SYS_CLK) to various parts of the computer system 10. Modem microprocessors and other integrated circuits, however, are typically capable of operating at frequencies significantly higher than the system clock signal, and thus, it becomes important to ensure that operations involving the microprocessor 12 and the other components of the computer system 10 use a proper and accurate reference of time.

One component used within the computer system 10 to ensure a proper reference of time among the system clock signal and a microprocessor clock signal, i.e., "chip clock signal" or CHIP_CLK, is a type of clock generator known as a phase-locked loop (PLL) 20. The PLL 20 is an electronic circuit that controls an oscillator such that the oscillator maintains a constant phase relative to the system clock signal. Referring to FIG. 1, the PLL 20 has as its input the system clock signal, which is its reference signal, and outputs a chip clock signal (shown in FIG. 1 as CHIP_CLK) to the microprocessor 12. The system clock signal and chip clock signal have a specific phase and frequency relationship controlled by the PLL 20. This relationship between the phases and frequencies of the system clock signal and chip clock signal ensures that the various components within the microprocessor 12 use a controlled and accounted for reference of time. When this relationship is not maintained by the PLL 20, however, the operations within the computer system 10 become indeterministic.

Another component used within the computer system 10 to ensure a proper reference of time among the system clock signal and a microprocessor clock signal, i.e., "clock out signal" or CLK_OUT, is a type of clock generator known as a delay-locked loop (DLL) 22. As the frequencies of modern computers continue to increase, the need to rapidly transmit data between chip interfaces also increases. To accurately receive data, a clock signal is often sent to help recover the data. The clock signal determines when the data should be sampled or latched by a receiver circuit.

The clock signal may transition at the beginning of the time the data is valid. The receiver circuit, however, may require that the clock signal transition during the middle of the time the data is valid. Also, the transmission of the clock signal may degrade as it travels from its transmission point. In both circumstances, a delay-locked loop 22, or "DLL," may be used to regenerate a copy of the clock signal at a fixed phase shift with respect to the original clock signal.

In FIG. 1, data is transmitted from integrated circuit 17 to the microprocessor 12. To aid in the recovery of the transmitted data, a clock signal 21 is also transmitted with the data. The microprocessor 12 may also transmit data to the integrated circuit 17 using an additional clock signal (not shown). The clock signal 21 may transition from one state to another at the beginning of data transmission. The microprocessor 12 requires a clock signal temporally located some time after the beginning of the valid data. Furthermore, the clock signal 21 may have degraded during transmission. The DLL 22 has the ability to regenerate the clock signal 21 to a valid state and to create a phase shifted version of the clock signal 21 to be used by other circuits. For example, the microprocessor 12 may use the phase shifted version of the clock signal 21 as the receiver circuit's sampling signal. The receiver circuit's sampling signal determines when the input to the receiver circuit should be sampled. The performance of a DLL 22 is critical and must maintain a proper reference of time on the CPU, or generically, an integrated circuit.

As the feature size of the circuit elements (i.e., n-channel and/or p-channel transistors) in the integrated circuits 16 and 17 shown in FIG. 1 continue to get smaller, the gate oxide and the junction thickness of the transistors is significantly reduced. As will be understood by those of skill in the art, the thin gate oxide thickness may cause a threshold voltage potential to vary, or "age," over time. Accordingly, aging of a transistor may affect critical circuits, thereby adversely impacting IC performance.

Figure 2:
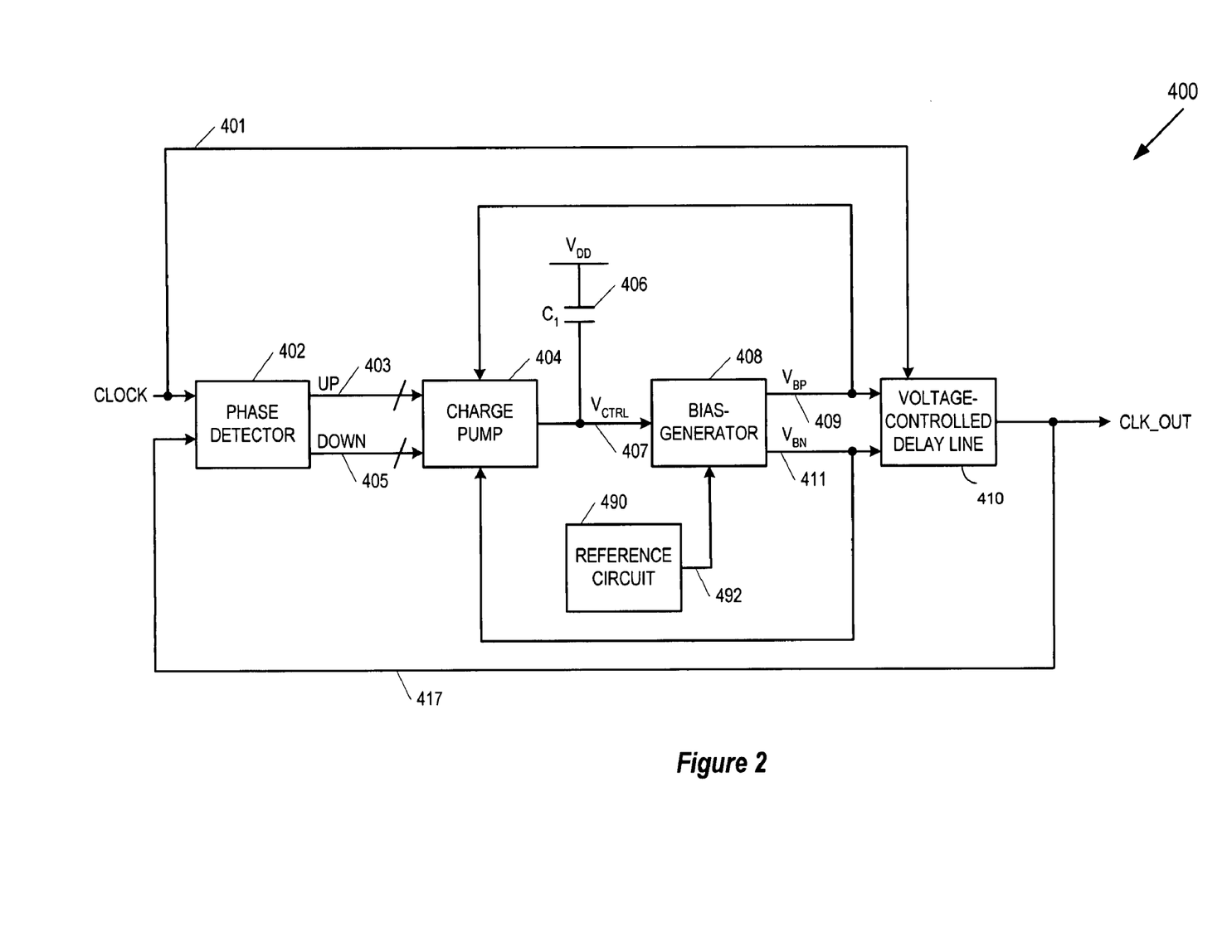
FIG. 2 shows a delay-locked loop system in accordance with an embodiment of the present invention.

FIG. 2 shows a block diagram of an exemplary delay-locked loop (DLL) system 400 in accordance with an embodiment of the present invention. Clock signal 401 is input to the DLL system 400 to create a phased (i.e., delayed) output. Particularly, clock signal 401 is input to a voltage-controlled delay line 410 and to a phase detector 402 of the DLL system 400. The phase detector 402 measures whether a phase difference between the clock signal 401 and an output signal, clk_out 417, of the voltage-controlled delay line 410 has the desired amount of delay. Depending on the phase difference, the phase detector 402 produces signals that control a charge pump 404. The phase detector 402 uses an up signal 403 and a down signal 405 to adjust the charge pump 404 to increase or decrease its output current.

To ensure that the charge pump 404 maintains some nominal current output, the charge pump 404 is internally biased. The internal biasing of the charge pump 404 is dependent on bias signals, $V_{BP}$ 409 and $V_{BN}$ 411, generated from a bias generator 408 (discussed below). The up and down signals 403 and 405 adjust the current output of the charge pump 404 with respect to the nominal current set by the bias signals 409 and 411.

The charge pump 404 adds or removes charge from a capacitor $C_1$ 406, which, in turn, changes a voltage potential at the input of the bias-generator 408. The capacitor 406 is connected between a power supply, $V_{DD}$, and a control signal, $V_{CTRL}$ 407. The bias-generator 408 produces the bias signals 409 and 411 in response to the control signal 407, which, in turn, controls the delay of the voltage-controlled delay line 410 and, as mentioned above, maintains a nominal current output from the charge pump 404.

In FIG. 2, the voltage-controlled delay line 410 may be implemented using current starved elements. In other words, the delays of the voltage-controlled delay line 410 may be controlled by modifying the amount of current available for charging and discharging capacitances within the voltage-controlled delay line 410. The linearity of a voltage controlled delay line's characteristics determines the stable range of frequencies over which the DLL system 400 can operate. The output signal 417 of the voltage-controlled delay line 410 represents a phase delayed copy of clock signal 401 that is then used by other circuits.

Still referring to FIG. 2, the negative feedback created by the output signal 417 in the DLL system 400 adjusts the delay through the voltage-controlled delay line 410. The phase detector 402 integrates the phase error that results between the clock signal 401 and the output signal 417. The voltage-controlled delay line 410 delays the output signal 417 by a fixed amount of time such that a desired delay between the clock signal 401 and the output signal 417 is maintained.

Proper operation of the microprocessor 12 shown in FIG. 1 depends on the DLL system 400 maintaining the output signal 417 at a constant frequency. The DLL system 400 may not operate as desired if circuit elements vary, or "age," over time. In one embodiment of the present invention, a reference circuit 490 is operatively connected using a reference signal line 492 to the bias generator 408. One of ordinary skill in the art will understand that the reference signal line 492 may carry a digital or analog signal.

In FIG. 2, the reference circuit 490 generates a signal to the bias generator 408 that is representative of variations caused by aging. In one embodiment of the present invention, the bias generator 408 is operatively adjusted such that variations due to aging of circuit elements within the bias generator 408 are reduced. One of ordinary skill in the art understands that most circuits age; however, circuit elements within the bias generator 408 may age such that the bias generator 408 varies dramatically from the bias generator's 404 initial design parameters. The reference circuit 490 generates a signal, representative of variations caused by aging, that helps reduce variations in the bias generator 404 caused by aging effects.

Figure 3:
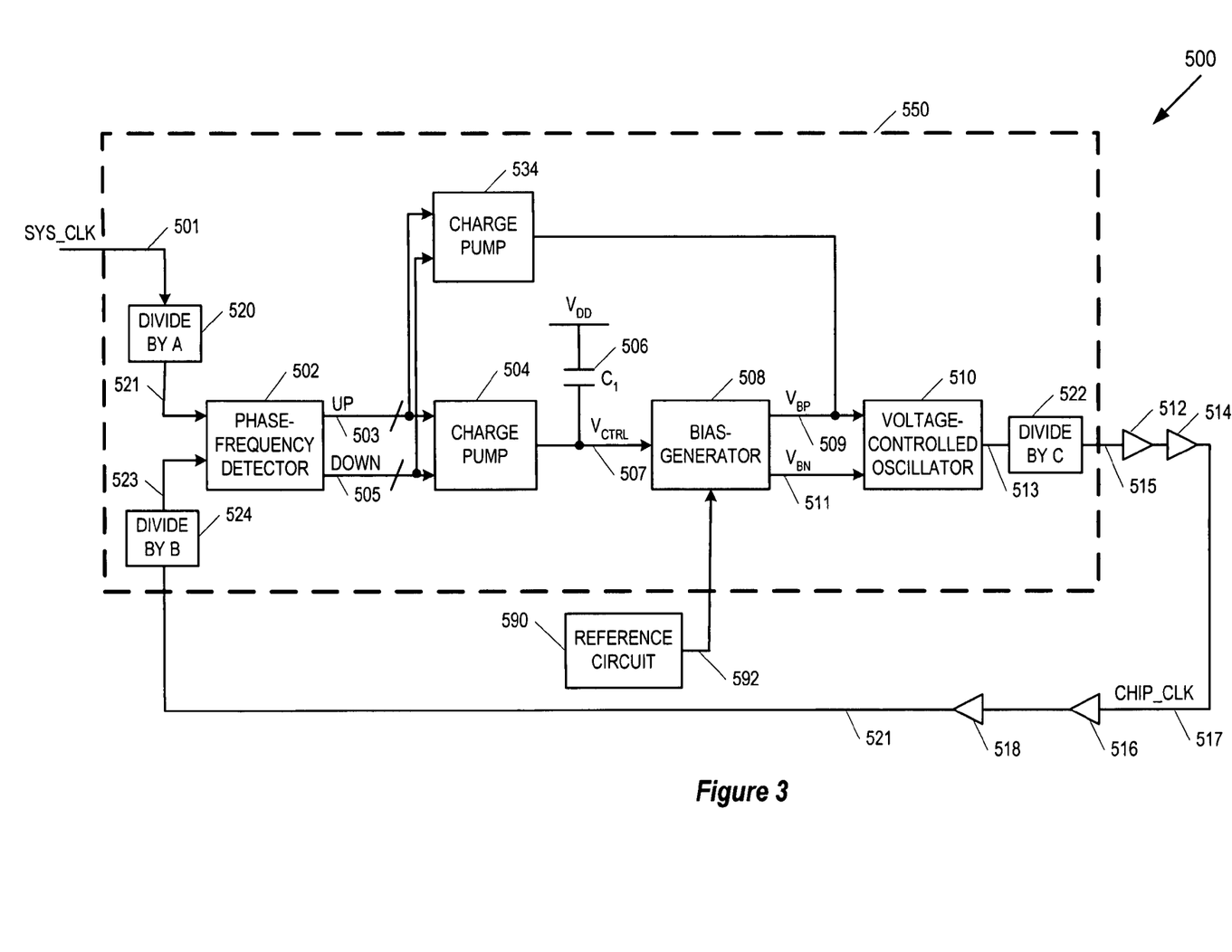
FIG. 3 shows a phase-locked loop system in accordance with an embodiment of the present invention.

FIG. 3 shows a block diagram of an exemplary phase-locked loop (PLL) system 500 in accordance with an embodiment of the present invention. The PLL system 500 includes a PLL core 550, buffers 512, 514, 516, and 518 and a feedback loop signal 521 on a feedback loop path. The buffers 512 and 514 increase the drive strength of an output clock signal 515 to supply other circuits of the microprocessor (12 in FIG. 1) with a chip clock signal 517. The buffers 516 and 518 buffer the chip clock signal 517 to additional circuits of the microprocessor (12 in FIG. 1). The time delay created by the buffers 512, 514, 516, and 518 is accounted for in the feedback signal 521 that is supplied to the PLL core 550.

The PLL core 550 is designed to output the chip clock signal 517, which is a multiple of the system clock signal 501. When the PLL system 500 is in "lock," the chip clock signal 517 and system clock signal 501 maintain a specific phase and frequency relationship. To allow different multiplication ratios, the PLL core 550 may use several "divide by" circuits. A "divide by" circuit reduces the frequency of the input to the "divide by" circuit at its output by a specified factor. For example, the PLL core 550 uses a divide by A circuit 520 with the system clock signal 501, a divide by C circuit 522 with a voltage-controlled oscillator 510 output signal 513, and a divide by B circuit 524 with the feedback loop signal 521.

A phase-frequency detector 502 aligns the transition edge and frequency of a clock A signal 521 and a clock B signal 523. The phase-frequency detector 502 adjusts its output frequency in order to zero any phase and frequency difference between the clock A signal 521 and the clock B signal 523. The phase-frequency detector 502 produces signals that control charge pumps 504 and 534. The phase-frequency detector 502 controls the charge pumps 504 and 534 to increase or decrease their output using control signals up 503 and down 505. The charge pump 504 adds or removes charge from a capacitor $C_1$ 506 that changes the voltage potential at the input of a bias-generator 508. The capacitor 506 is connected between a power supply $V_{DD}$ and a voltage potential on a control signal $V_{CTRL}$ 507. The charge pump 534 adds or removes charge from a bias voltage $V_{BP}$ 509 of a bias-generator 508.

The bias-generator 508 produces bias voltages $V_{BP}$ 509 and $V_{BN}$ 511 in response to the voltage potential on the control signal 507. The PLL core 550 may be self-biased by adding the charge pump 534 to the bias-generator 508 bias voltage $V_{BP}$ 509. The addition of a second charge pump 534 allows the removal of a resistor in series with the capacitor 506. A voltage-controlled oscillator 510 produces an output signal 513 that has a frequency related to the bias voltages $V_{BP}$ 509 and $V_{BN}$ 511.

The "divide by" circuits 520, 522, and 524 determine the frequency multiplication factor provided by the PLL core 550. The addition of "divide by" circuits 520, 522, and 524 enables the PLL core 550 to multiply the system clock signal 501. Multiplying the system clock signal 501 is useful when the chip clock signal 517 must have a higher frequency than the system clock signal 501.

For example, the variables A and C may both be set to one in the divide by A circuit 520 and divide by C circuit 522, respectively. The variable B may be set to 10 in the divide by B circuit 524. The phase-frequency detector 502 aligns the transition edge and frequency of the clock A signal 521 and the clock B signal 523. The phase-frequency detector 502 adjusts the PLL core 550 output clock signal 515 frequency in order to zero any phase and frequency difference between the clock A signal 521 and the clock B signal 523. Because the clock B signal 523 has a divide by B circuit 524 that reduces its input frequency by 10, the phase-frequency detector 502 adjusts the voltage-controlled oscillator 510 output signal 513 to a frequency 10 times greater than the clock A signal 521. Accordingly, the chip clock signal 517 is 10 times higher in frequency than the system clock signal 501.

Proper operation of the microprocessor (12 shown in FIG. 1) depends on the PLL system 500 maintaining the chip clock signal 517 at a constant frequency. The PLL system 500 may not operate as desired if circuit elements vary, or "age," over time. In one embodiment of the present invention, a reference circuit 590 is operatively connected using a reference signal line 592 to the bias generator 508. One of ordinary skill in the art will understand that the reference signal line 592 may carry a digital or analog signal.

In FIG. 3, the reference circuit 590 generates a signal to the bias generator 508 that is representative of variations caused by aging. In an embodiment of the present invention, the bias generator 508 are operatively adjusted such that variations due to aging of circuit elements within the bias generator 508 are reduced.

Figure 4:
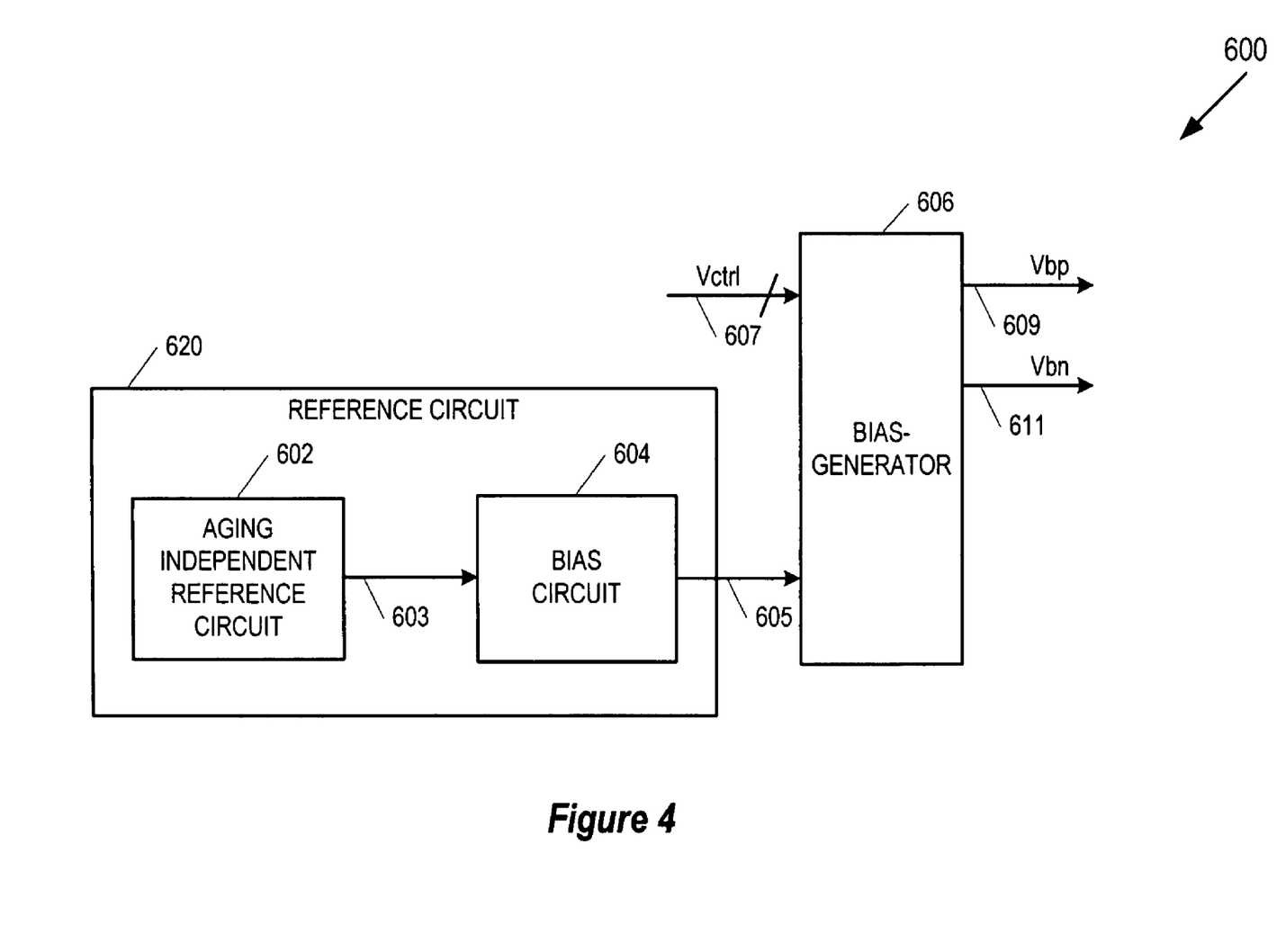
FIG. 4 shows a bias generator adjustment system in accordance with an embodiment of the present invention.

FIG. 4 shows a block diagram of an exemplary bias generator adjustment system 600 in accordance with an embodiment of the present invention. The bias generator adjustment system 600 includes a bias generator 606 and a reference circuit 620. The bias generator 606 generates bias voltages $V_{BP}$ 609 and $V_{BN}$ 611 dependent on a control voltage $V_{CTRL}$ 607. One or both of the bias voltages $V_{BP}$ 609 and $V_{BN}$ 611 from the bias generator 606 may vary over time, caused by aging of circuit elements in the bias generator 606. A reference circuit 620 is operatively connected using a reference signal line 605 to the bias generator 606. One of ordinary skill in the art will understand that the reference signal line 605 may carry a digital or analog signal. In one embodiment of the present invention, the reference signal line 605 carries an analog signal representative of variations caused by aging.

The reference circuit 620 includes an aging independent reference circuit 602 and a bias circuit 604. In an embodiment of the present invention, the aging independent reference circuit 602 may generate a voltage potential or a current for an aging independent reference signal on signal line 603. Accordingly, signal line 603 may carry the aging independent reference signal that is substantially independent with respect to aging effects. In one embodiment of the present invention, the aging independent reference circuit 602 may be a bandgap voltage potential reference.

The bias circuit 604 may use the aging independent reference signal on signal line 603 to determine a variation in transistor performance caused by aging effects. A signal on the reference signal line 605 may represent a result of a comparison between the aging independent reference signal on signal line 603 and at least one transistor whose performance may have varied due to aging effects. For example, a threshold voltage potential may vary, or "age," over time. The signal on the reference signal line 605 may adjust the bias generator 606 such that the current on the out signal 611 responds to the up signal 607 or the down signal 609 regardless of aging that may occur within circuit elements in the bias generator 606.

Figure 5A:
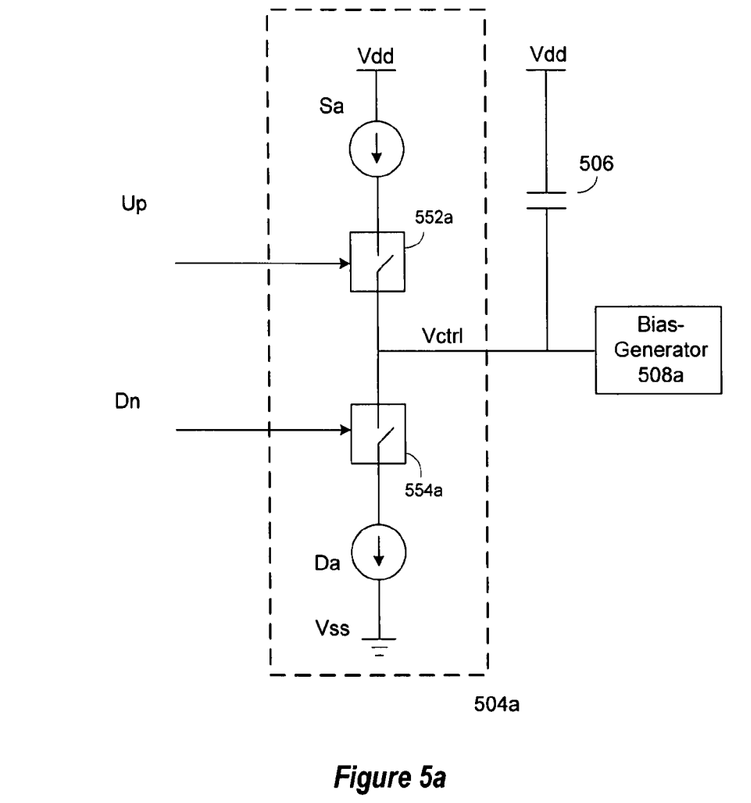
FIG. 5a is an illustration of a charge pump used in one embodiment of a phase-locked loop in accordance with the present invention.

FIG. 5a is an example of a charge pump 504a of the type typically used in a phase-locked loop. The charge pump 504a comprises a current source, Sa, that is controlled by switch 552a and a current drain, Da, that is controlled by switch 554a. The current provided to the bias generator 508 is increased by closing switch 552a in response to an "Up" control signal. Likewise the current to the bias generator 508 is decreased by closing switch 554a in response to a "Down" control signal.

Figure 5B:
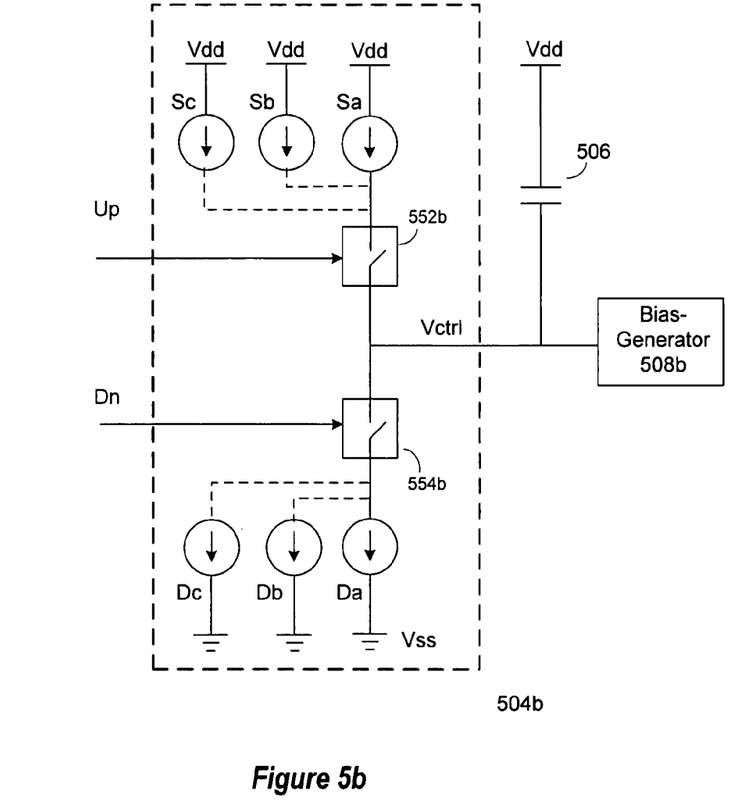
FIG. 5b is an illustration of a charge pump having multiple legs in accordance with an alternate embodiment of the present invention.

FIG. 5b is an illustration of a charge pump 504b having multiple legs in accordance with an alternate embodiment of the present invention. The charge pump 504b comprises a multiple current sources, Sa, Sb, and Sc that are controlled by switch 552b and multiple current drains, Da, Db, and Dc that are controlled by switch 554b. The current provided to the bias generator 508 is increased by closing switch 552a in response to an "Up" control signal. The dashed lines for the current sources in FIG. 5b illustrate generally that a combination of the current sources can be combined to provide additional current tailored to mitigate the effects of aging of circuit components. Likewise, the current to the bias generator 508 is decreased by closing switch 554a in response to a "Down" control signal. The dashed lines for the current drains in FIG. 5b illustrate generally that a combination of the current sources can be combined to provide additional current drain if needed.

Figure 6:
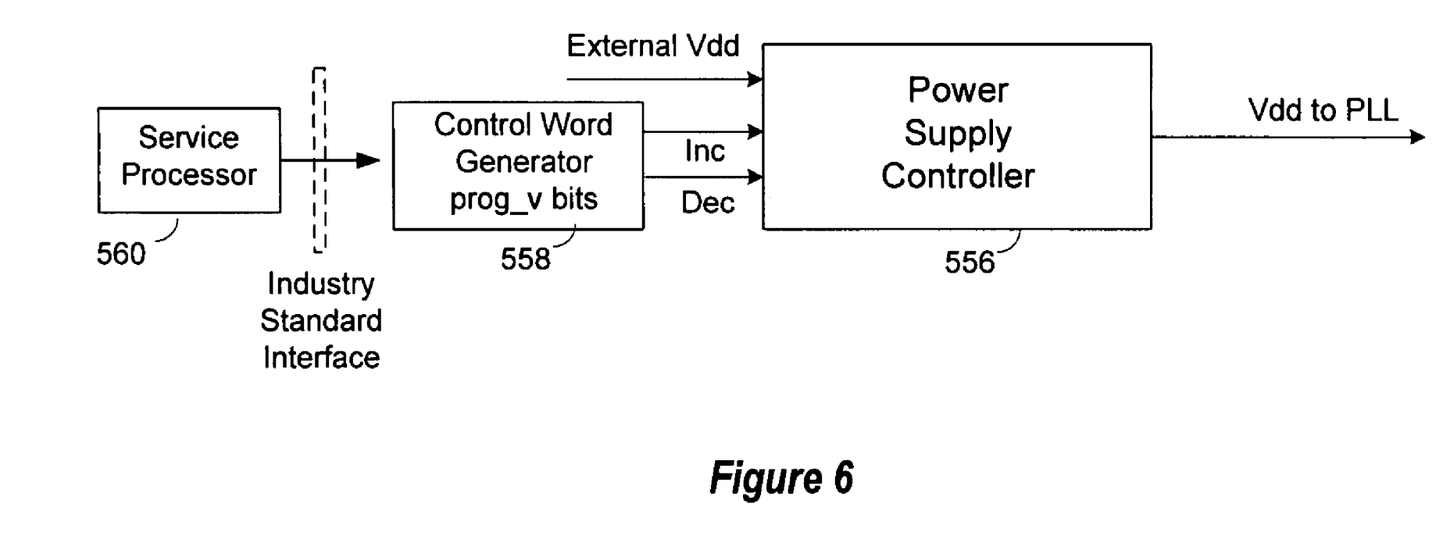
FIG. 6 is an illustration of an embodiment of the present invention wherein power supply control words are used to change the level of power supplied to a circuit component to compensate for the effects of aging.

FIG. 6 is an illustration of an embodiment of the present invention wherein power supply voltage control words are used to change the level of power supplied to a circuit component to compensate for the effects of aging. In this embodiment, a processor is characterized for the effects of aging and a predicted aging-effect curve. In an alternate embodiment, a power supply controller 556 adjusts the power level provided to the PLL in response to a voltage control word prog_v illustrated by reference numeral 558. The control words are generated by a service processor 560 that is operable to generate the control words to increase or decrease the power provided to the PLL in accordance with a predetermined aging-effect versus time curve.

Figure 7:
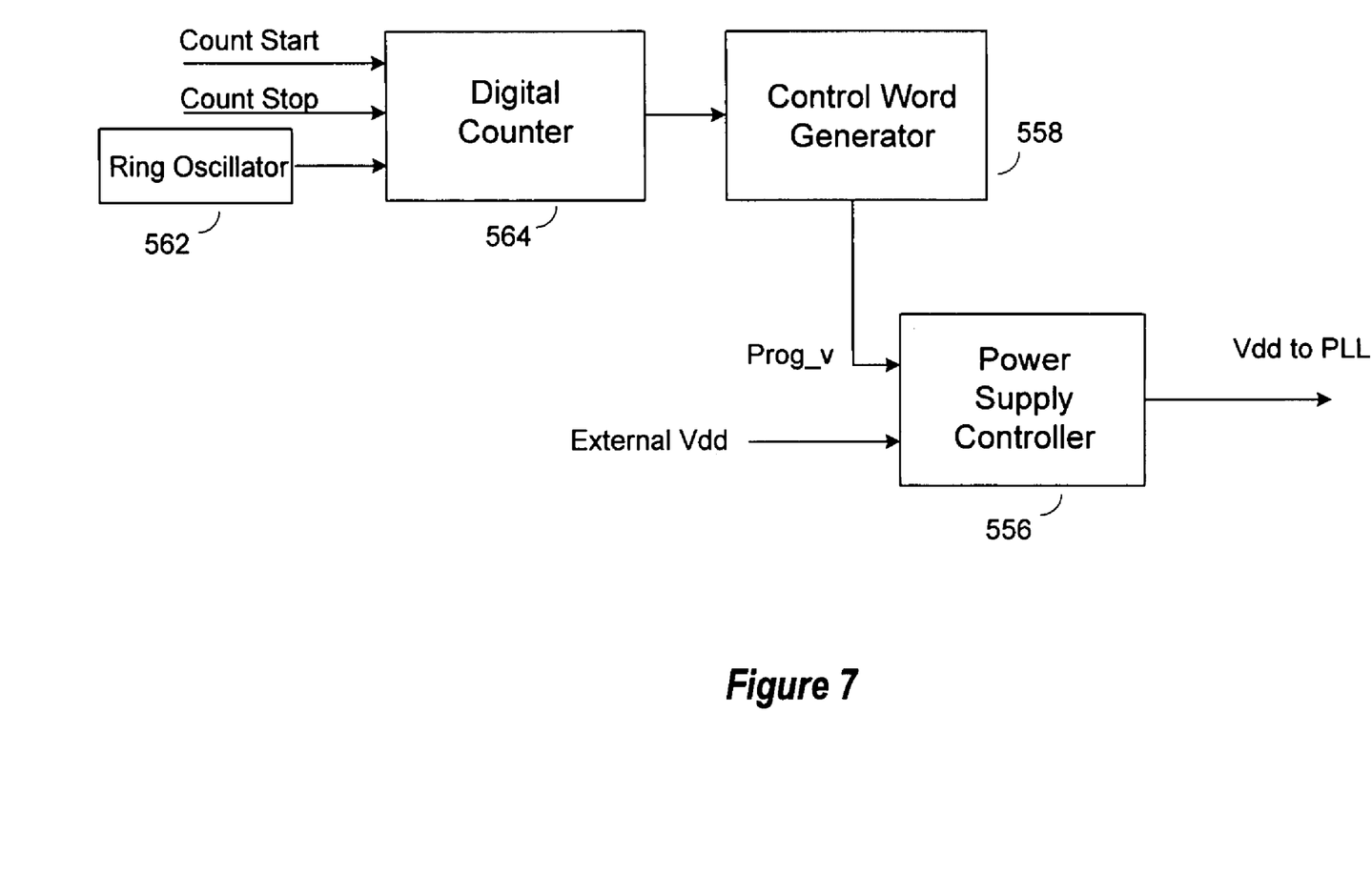
FIG. 7 illustrates an embodiment of the present invention wherein a ring oscillator is used to approximate the effects of NBTI on the speed of a circuit component to provide a basis for compensating for the effect of aging.

FIG. 7 illustrates an embodiment of the present invention wherein a ring oscillator 562 is used to approximate the effects of NBTI on the speed of a circuit component to provide a basis for compensating for the effect of aging. In this embodiment, the frequency domain is converted to time domain using a digital counter 564. The digital counter generates an output signal that is used by a control word generator 558 to generate prog_v control words for the power supply controller 556 that is operable to adjust the level of the Vdd provided to the PLL.

Figure 8:
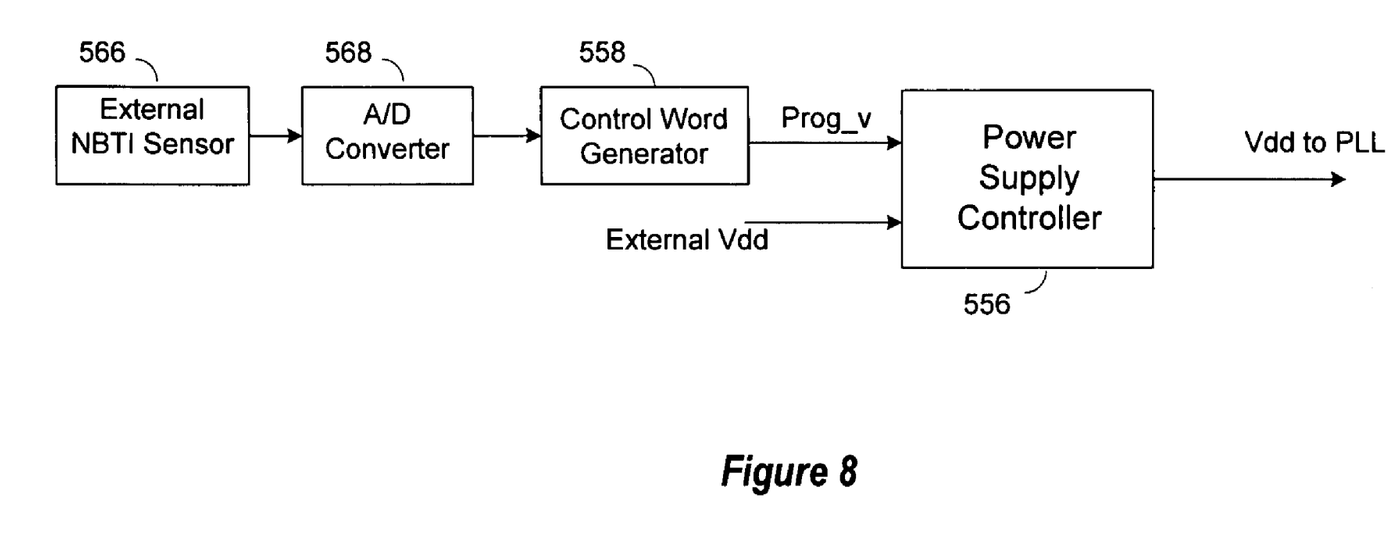
FIG. 8 is an illustration of an embodiment of the present invention wherein NBTI sensors are used to adjust the power supply voltage of the phase-locked loop to compensate for reductions in drive current.

FIG. 8 is an illustration of an embodiment of the present invention wherein NBTI sensors 566 are used to adjust the power supply voltage of the phase-locked loop to compensate for reductions in drive current. In this embodiment, an external NBTI sensor 566 provides an analog signal that is converted into a digital format by an analog-to-digital converter 568. The output of the analog-to-digital converter 568 is used by the control word generator 558 to generate appropriate digital prog_v control signals that can be used by the power supply contoller 556 to change the level of Vdd provided to the PLL to ensure sufficient voltage to overcome age-related performance degradation.

Figure 9:
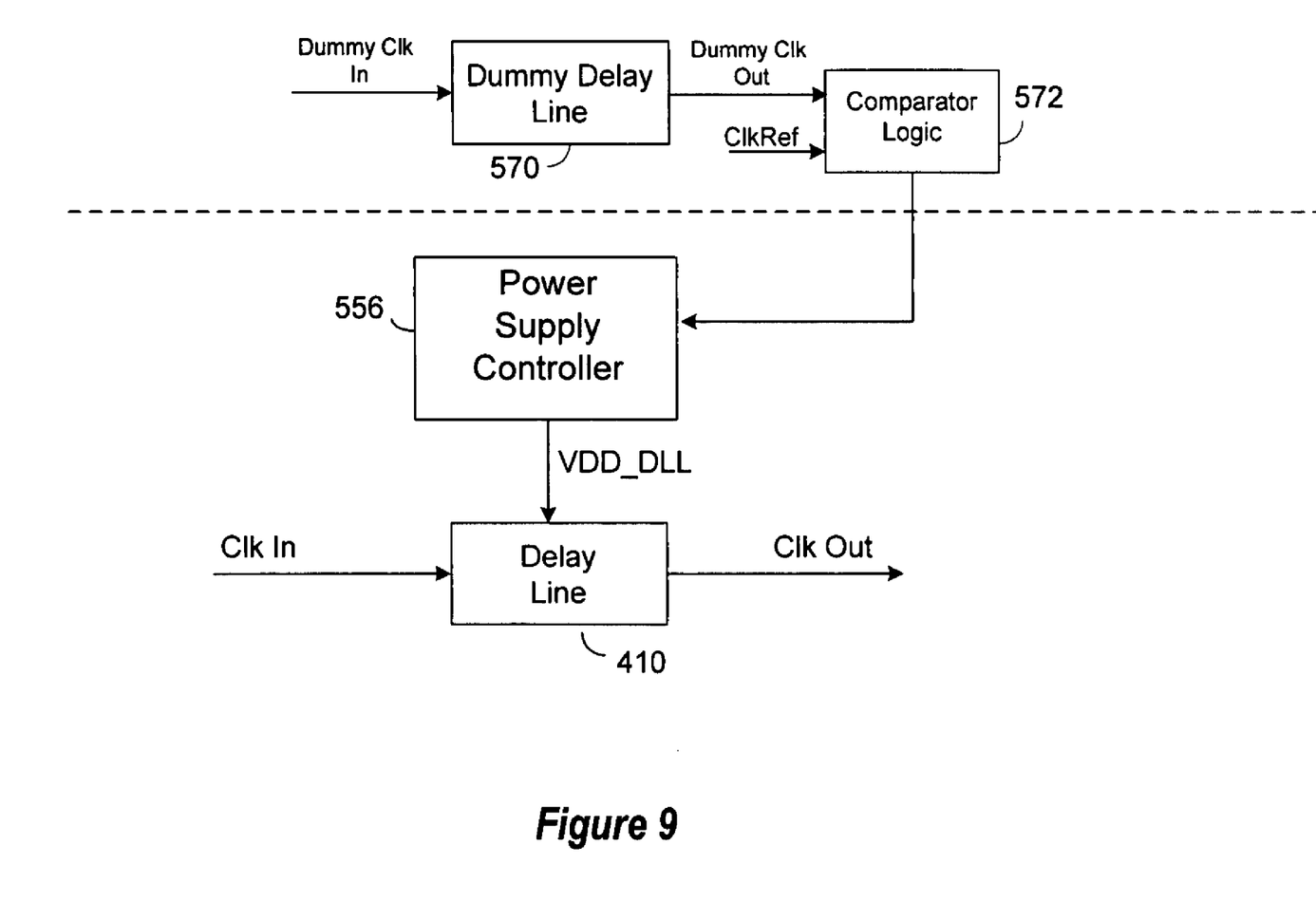
FIG. 9 is an illustration of an embodiment of the present invention wherein a dummy delay line is used to generate a voltage control signal that maintains operation of a delay-locked loop in accordance with a predetermined voltage-delay reference curve.

FIG. 9 is an illustration of an embodiment of the present invention wherein a dummy delay line 570 is used to generate a voltage control signal that maintains operation of a delay-locked loop in accordance with a predetermined voltage-delay reference curve. The dummy delay line 570 generates a "dummy clock" output signal that is provided to a comparator 572 along with a reference clock signal "ClkRef." The comparator generates a difference signal that is representative of the performance of the dummy delay line compared to an expected reference performance curve. This difference signal is used by the power supply controller 558 to generate a delay line voltage signal VDD_DLL that is used to increase or decrease the voltage level provided to the delay line 410 to maintain performance to compensate for age-related degradation effects.

Figure 10:
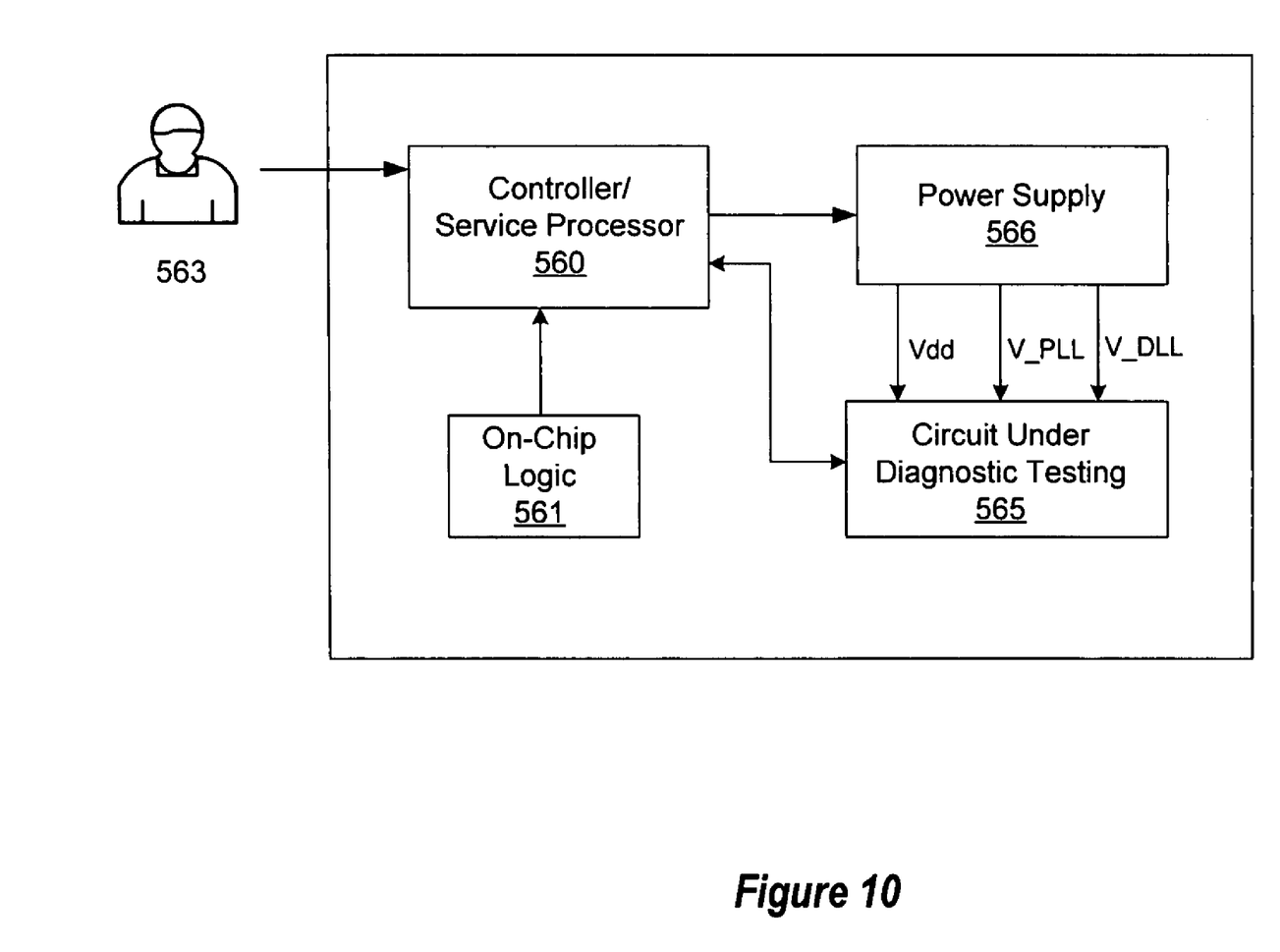
FIG. 10 illustrates the use of a service processor to implement the method and apparatus of the present invention to compensate for aging effects in integrated circuits.

The various embodiments of the present invention as discussed herein can be implemented using a service processor 560 to control the power supply outputs that are provided to a circuit 565 under diagnostic testing, as illustrated in FIG. 10. Operation of the service processor 560 can be controlled by a service technician 570 or by appropriate control logic generated by on-chip logic 561. As discussed in connection with the various embodiments described hereinabove, the power supply 556 can be controlled by the service processor 560 to change the various outputs, such as Vdd, V_PLL and V_DLL to compensate for aging effects of circuit paths in the CPU and for aging effects relating to operation of the PLL and DLL.

Figure 11:
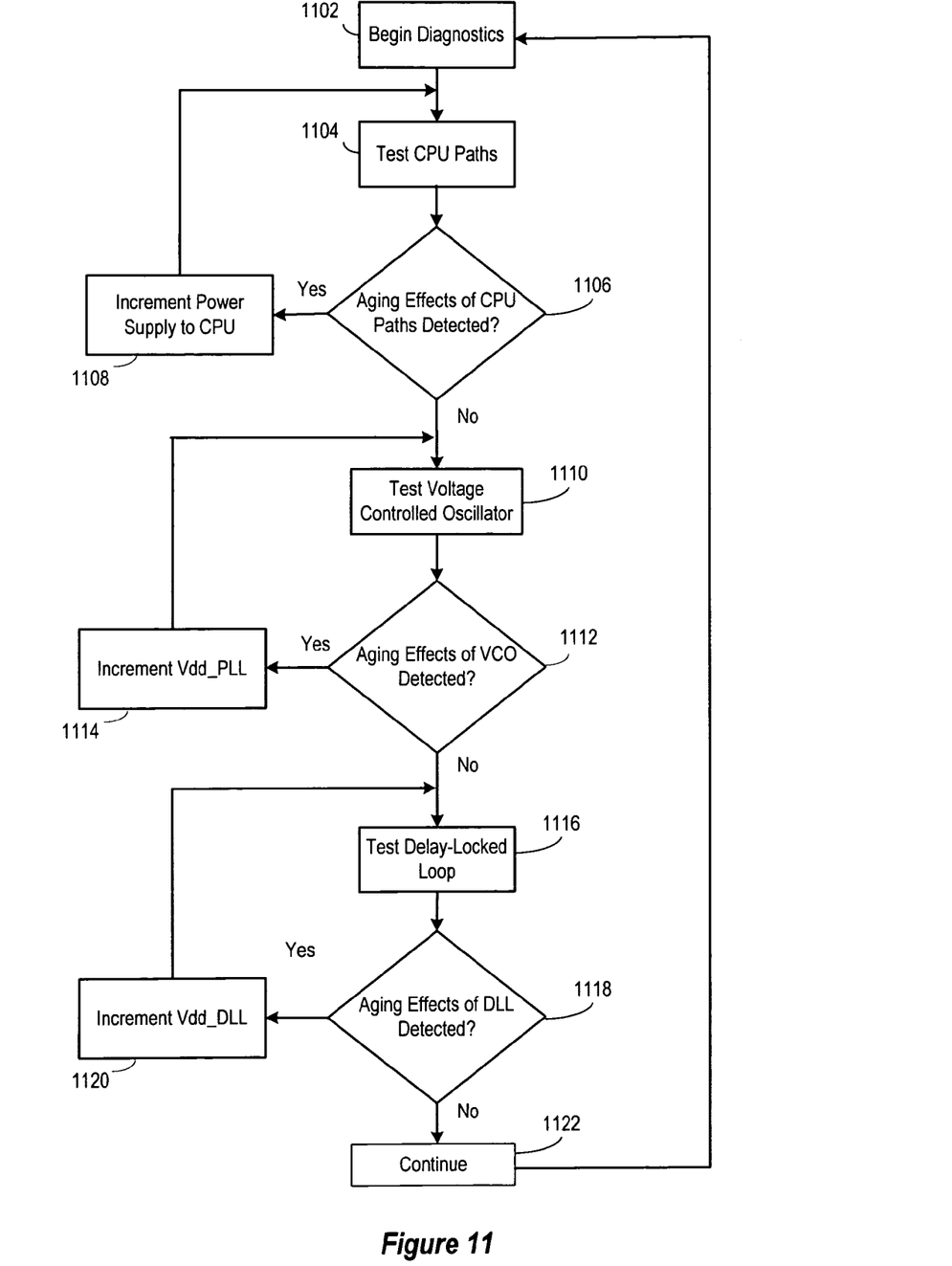
FIG. 11 is a flow chart illustration of the processing steps for implementing the method of the present invention for compensating for aging effects in integrated circuits.

FIG. 11 is a flow chart illustration of the processing steps for implementing the method of the present invention to compensate for aging effects in integrated circuits. In step 1102 diagnostics are initiated. In step 1104, data is collected regarding performance of the logic paths of the CPU. In step 1106, a test is conducted to determine if aging effects have degraded the performance of the CPU logic paths. If the result of the test conducted in step 1106 indicates that the performance of the logic paths of the CPU has been degraded due to aging effects, then the power supplied to the CPU is incremented in step 1108. If, however, the test conducted in step 1106 indicates that the performance of the CPU logic paths has not degraded, processing proceeds to step 1110 where data is collected regarding operation of the voltage-controlled oscillator of the PLL. In step 1112, a test is conducted to determine whether operation of the voltage-controlled oscillator has been degraded due to aging effects. If the result of the test conducted in step 1112 indicates that the performance of the voltage-controlled oscillator has been degraded, then the power supplied to the voltage-controlled oscillator is changed in step 1114 by incrementing the value of Vdd_PLL. If, however, the result of the test conducted in step 1112 indicates that operation of the voltage-controlled oscillator has not been degraded due to aging effects, processing proceeds to step 1116 where data is collected regarding operation of the delay-locked loop. In step 1118, a test is conducted to determine whether operation of the delay-locked loop has been degraded due to aging effects. If the result of the test conducted in step 1118 indicates that the performance of the delay-locked loop has been degraded, then the power supplied to the delay-locked loop is changed in step 1120 by incrementing the value of Vdd_DLL. If, however, the result of the test conducted in step 1118 indicates that operation of the delay-locked loop has not been degraded due to aging effects, processing proceeds to step 1122 and the diagnostic processing steps discussed above are repeated.

Advantages of the present invention may include one or more of the following. In one or more embodiments, because transistors may age, the voltage and current levels that are provided to the various circuit components can be tailored to the specific age-based performance profile of the component to ensure proper operation throughout the life of the component. In one or more embodiments of the invention, a reference circuit uses an aging independent reference circuit and a bias circuit to compensate for aging effects. The bias circuit compares an output from the aging independent reference circuit and at least one circuit element that is affected by aging effects. Accordingly, the reference circuit may adjust a PLL or DLL bias generator such that an output from the bias generator does not substantially skew over a lifetime, or other time period, of an IC.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An integrated circuit, comprising:
   a sensor operable to detect performance variations of an individual circuit in said integrated circuit, wherein the individual circuit comprises a phase-locked loop, and wherein said performance variation is related to aging of said integrated circuit; and
   a compensation circuit operable to change the operating characteristics of said individual circuit to compensate for said performance variation in accordance with an aging-versus time performance curve, wherein the compensation circuit comprises a charge pump having multiple legs that can be selectively enabled to change the performance characteristics of said phase-locked loop.

2. The integrated circuit of claim 1, wherein said compensation circuit comprises a power supply controlled by digital control words to selectively change the operating characteristics of said phase-locked loop.

3. The integrated circuit of claim 1, comprising a ring oscillator operable to approximate the effects of NBTI and to generate a compensation signal corresponding thereto.

4. The integrated circuit of claim 3, wherein said compensation signal is used to generate digital control words to control operation of a power supply.

5. The integrated circuit of claim 4, wherein said power supply is operable to control operation of a voltage controlled oscillator in said phase-locked loop.

6. The integrated circuit of claim 1, wherein said individual circuit is a delay-locked loop.

7. The integrated circuit of claim 6, wherein the compensation circuit comprises:
   a dummy delay line operable to generate a dummy delay line clock signal;
   a reference source operable to generate a reference clock signal; and
   a comparator operable to compare the dummy delay line clock signal and the reference clock signal and to generate a control signal therefrom.

8. The integrated circuit of claim 7, further comprising a power supply controller operable to control operation of the delay line of said delay-locked loop in response to said control signal.

9. The integrated circuit of claim 8, wherein said power supply controller controls operation of said delay line by generating a digital power supply control word (VDD_DLL).

10. A method for controlling operation of an integrated circuit comprising:
    detecting performance variations of an individual circuit in said integrated circuit, wherein the individual circuit comprises a phase-locked ioop and wherein said performance variation is related to aging of said integrated circuit; and
    generating a compensation signal to change the operating characteristics of said individual circuit to compensate for said performance variation in accordance with an aging-versus time performance curve, wherein said compensation signal is generated by a charge pump having multiple legs that can be selectively enabled to change the performance characteristics of said phase-locked loop.

11. The method of claim 10, wherein compensation signal is generated by a power supply controlled by digital control words to selectively change the operating characteristics of said phase-locked loop.

12. The method of claim 10, wherein said compensation signal is generated by a ring oscillator operable to approximate the effects of NBTI and to generate a compensation signal corresponding thereto.

13. The method of claim 12, wherein said compensation signal is used to generate digital control words to control operation of a power supply.

14. The method of claim 13, wherein said power supply is operable to control operation of a voltage controlled oscillator in said phase-locked loop.

15. The method of claim 10, wherein said individual circuit is a delay-locked loop.

16. The method of claim 15, wherein the compensation circuit comprises:
    a dummy delay line operable to generate a dummy delay line clock signal;
    a reference source operable to generate a reference clock signal; and
    a comparator operable to compare the dummy delay line clock signal and the reference clock signal and to generate a control signal therefrom.

* * * * *

UNITED STATES PATENT AND TRADEMARK OFFICE
CERTIFICATE OF CORRECTION

PATENT NO. : 7,129,800 B2  Page 1 of 1
APPLICATION NO. : 10/771989
DATED : October 31, 2006
INVENTOR(S) : Claude R. Gauthier et al.

It is certified that error appears in the above-identified patent and that said Letters Patent is hereby corrected as shown below:

In column 10, at line 28, delete "ioop" and insert --loop--.

Signed and Sealed this

Sixth Day of March, 2007

JON W. DUDAS
*Director of the United States Patent and Trademark Office*